US006338445B1

(12) United States Patent
Lambert et al.

(10) Patent No.: US 6,338,445 B1
(45) Date of Patent: Jan. 15, 2002

(54) FUEL INJECTOR

(75) Inventors: Malcolm David Dick Lambert, Bromley; Peter Simon, Chatham, both of (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/679,790

(22) Filed: Oct. 5, 2000

(30) Foreign Application Priority Data

Oct. 6, 1999 (GB) .......................................... 9923479
Nov. 13, 1999 (GB) .......................................... 9926787

(51) Int. Cl.[7] ........................ F02M 61/00; F02M 51/00; B05B 1/30; F16K 1/00

(52) U.S. Cl. .............................. 239/533.12; 239/533.2; 239/585.1; 239/585.5; 137/630.22; 251/334

(58) Field of Search ........................... 239/533.2, 533.3, 239/533.4, 533.9, 533.11, 533.12, 585.1, 583, 584, 585.5; 137/629, 630.22; 251/334

(56) References Cited

U.S. PATENT DOCUMENTS 4,202,500 A * 5/1980 Keiczek ................... 239/533.3
4,284,043 A * 8/1981 Happel ....................... 123/299
4,382,554 A * 5/1983 Hofmann ................. 239/533.3
4,407,457 A * 10/1983 Seifert ................... 239/533.12
4,759,334 A * 7/1988 Williamson ................. 123/510
5,823,446 A * 10/1998 Bennett et al. .......... 239/585.1
5,899,389 A * 5/1999 Pataki et al. ............. 239/533.2

* cited by examiner

*Primary Examiner*—David A. Scherbel
*Assistant Examiner*—Davis Hwu
(74) *Attorney, Agent, or Firm*—Thomas A. Twomey

(57) ABSTRACT

A fuel injector comprising a nozzle body having a first bore defining first and second seatings, an outer valve needle being slidable within the first bore and engageable with the first seating to control fuel flow from a first outlet opening. The outer valve needle is provided with a second bore within which an inner valve needle is slidable, the inner valve needle being engageable with the second seating to control fuel delivery through a second outlet opening. The outer valve needle includes a deformable region which is shaped such that, in use, when the outer valve needle is urged against the first seating, the outer valve needle deforms. The deformable region may be shaped such that, in use, when the outer valve needle is urged against the first seating, the outer valve needle deforms to close the first outlet opening. Alternatively, or in addition, the deformable region may be shaped such that, in use, when the outer valve needle is urged against the first seating, the outer valve needle cooperates with the inner valve needle to form a substantially fluid tight seal. The fuel injector may further comprise a valve insert member received within an upper region of the second bore, the valve insert member being engageable with an additional seating defined by an open end of the second bore to permit fuel upstream of the inner valve needle to vent from the second bore.

16 Claims, 7 Drawing Sheets

31
32
30a
30b
12d
30
16
17d
15a
12a
24
23
18c
17c
22
20
12
11
18d
10
12c
17b 15
27a
17
29
18a
17a
14
26

FUEL INJECTOR

This invention relates to a fuel injector for use in supplying fuel, under pressure, to a combustion space of a compression ignition internal combustion engine.

In order to reduce emissions levels, it is known to provide fuel injectors in which the total area of the openings through which fuel is delivered can be varied, in use. One technique for achieving this is to use two valve needles, one of which is slidable within a bore provided in the other of the needles to control the supply of fuel to some of the outlet openings independently of the supply of fuel to others of the outlet openings.

A known fuel injector of this type includes an outer valve needle which is provided with a through bore within which an inner valve needle is slidable, the outer valve needle being slidable within a bore provided in a fuel injector nozzle body. The nozzle body is provided with first and second outlet openings, occupying different axial positions in the nozzle body. A valve insert member is received within the through bore provided in the outer valve needle, the lower end surface of the valve insert member, the bore provided in the outer valve needle and an upper surface of the inner valve needle together defining a spring chamber which houses a compression spring, the spring serving to urge the inner valve needle against the second seating.

When the outer valve needle is moved away from the first seating by an amount less than a predetermined amount, fuel is delivered through the first outlet opening and the inner valve needle remains seated to prevent fuel delivery through the second outlet opening. When the outer valve needle is moved away from the first seating by an amount greater than the predetermined amount, a surface of the outer valve needle engages an enlarged region of the inner valve needle, movement of the outer valve needle thereby being transmitted to the inner valve needle causing the inner valve needle to move away from the second seating to permit fuel delivery through the second outlet opening. In this way, the fuel delivery rate, or other injection characteristic, can be varied, in use, by controlling the extent of movement of the outer valve needle away from its seating.

Fuel injectors of this type do, however, suffer from the disadvantage that, during the non-injecting stages of the injection cycle, fuel may be able to escape from the spring chamber, thereby causing poor emissions. Additionally, exhaust gases from the engine cylinder may be able to enter the spring chamber which can degrade the performance of the fuel injector. The inner valve needle is also subjected to undesirably high stresses during operation, particularly just prior to the inner valve needle being moved away from the second seating to expose the second outlet opening.

It is an object of the present invention to provide a fuel injector which alleviates one or more of the aforementioned problems.

According to a first aspect of the present invention there is provided a fuel injector comprising a nozzle body having a first bore defining first and second seatings, an outer valve needle being slidable within the first bore and engageable with the first seating to control fuel flow from a first outlet opening, the outer valve needle being provided with a second bore within which an inner valve needle is slidable, the inner valve needle being engageable with the second seating to control fuel delivery through a second outlet opening, the outer valve needle including a deformable region which is shaped such that, in use, when the outer valve needle is urged against the first seating, the outer valve needle deforms.

In one embodiment of the invention, the deformable region is shaped such that, in use, when the outer valve needle is urged against the first seating, the outer valve needle cooperates with the inner valve needle to form a substantially fluid tight seal.

By providing the outer valve needle with the deformable region, when the outer valve needle is seated against the first seating the volume defined by the inner valve needle, the outer valve needle and the fuel injector nozzle body within which fuel can reside is significantly reduced. Thus, a reduced volume of fuel is exposed to exhaust gases from the engine cylinder or other combustion space, thereby improving the performance of the fuel injector.

Alternatively, or in addition, the deformable region may be shaped such that, in use, when the outer valve needle is urged against the first seating, the outer valve needle deforms to close the first outlet opening.

Conveniently, a chamber is defined within the second bore, cooperation between the deformable region of the outer valve needle and the inner valve needle when the outer valve needle is urged against the first seating causing the chamber to be substantially sealed.

As the chamber is sealed when the outer valve needle is seated against the first seating, exhaust gases from the engine cylinder or other combustion space are prevented from entering the chamber. This improves the performance of the fuel injector. Additionally, as fuel is unable to escape from the fuel injector when the outer valve needle is seated against the first seating, leakage of fuel from the fuel injector during undesirable stages of the fuel injecting cycle is substantially avoided.

Conveniently, the inner valve needle and the outer valve needle may be arranged such that movement of the outer valve needle away from the first seating beyond a predetermined amount is transmitted to the inner valve needle, thereby causing the inner valve needle to move away from the second seating.

The outer valve needle may be provided with a surface which is engageable with a first region of the inner valve needle to transmit movement of the outer valve needle to the inner valve needle. The first region and the surface are preferably of substantially frusto-conical form.

Preferably, the surface of the outer valve needle which is engageable with the first region is located on the outer valve needle at a position remote from the deformable region. As the surface is located remotely from the deformable region, towards the uppermost open end of the second bore, the fuel injector is easier to manufacture.

The inner valve needle may further comprise a second region located downstream of the first region, the second region being of substantially frusto-conical form such that stresses within the second region of the inner valve needle are minimized upon engagement between the surface of the outer valve needle and the first region of the inner valve needle.

The inner valve needle may be slidable within a lower region of the second bore and a valve insert member may be received within an upper region of the second bore, the valve insert member being engageable with a seating defined by the open end of the second bore remote from the inner valve needle to permit fuel upstream of the inner valve needle to vent from the second bore.

According to a second aspect of the present invention there is provided a fuel injector comprising a nozzle body having a first bore defining first and second seatings, an outer valve needle slidable within the first bore and engageable with the first seating to control fuel flow from a first outlet opening, the outer valve needle being provided with a second bore within which an inner valve needle is slidable, the inner valve needle being engageable with the second seating to control fuel delivery through a second outlet opening, the inner valve needle comprising a first region which is engageable with a surface defined by the second bore such that movement of the outer valve needle away from the first seating beyond a predetermined amount is transmitted to the inner valve needle when the surface engages the first region, and comprising a second region located downstream of the first region, the second region being of substantially frusto-conical form such that stresses within the second region of the inner valve needle are minimized upon engagement between the surface of the outer valve needle and the first region of the inner valve needle. By providing the inner valve needle with the second region of substantially frusto-conical form, stresses which are transmitted to the inner valve needle just prior to movement of the outer valve needle can be reduced.

According to a third aspect of the present invention there is provided a fuel injector comprising a nozzle body having a first bore defining first and second seatings, an outer valve needle slidable within the first bore and engageable with the first seating to control fuel flow from a first outlet opening, the outer valve needle being provided with a second bore, an inner valve needle being slidable within a lower region of the second bore and a valve insert member being received within an upper region of the second bore, the valve insert member being engageable with a seating defined by the open end of the second bore remote from the inner valve needle to permit fuel upstream of the inner valve needle to vent from the second bore.

As the seating with which the valve insert member is engageable is located at the open end of the second bore, the seating is easier to manufacture.

The fuel injector may further comprise a spacer member, received within the second bore provided in the outer valve needle, the spacer member being interposed between the inner valve needle and the valve insert member. The spacer member and the valve insert member may be integrally or separately formed.

The invention will now be described, by way of example only, with reference to the accompanying drawings, in which.

Figure 1:
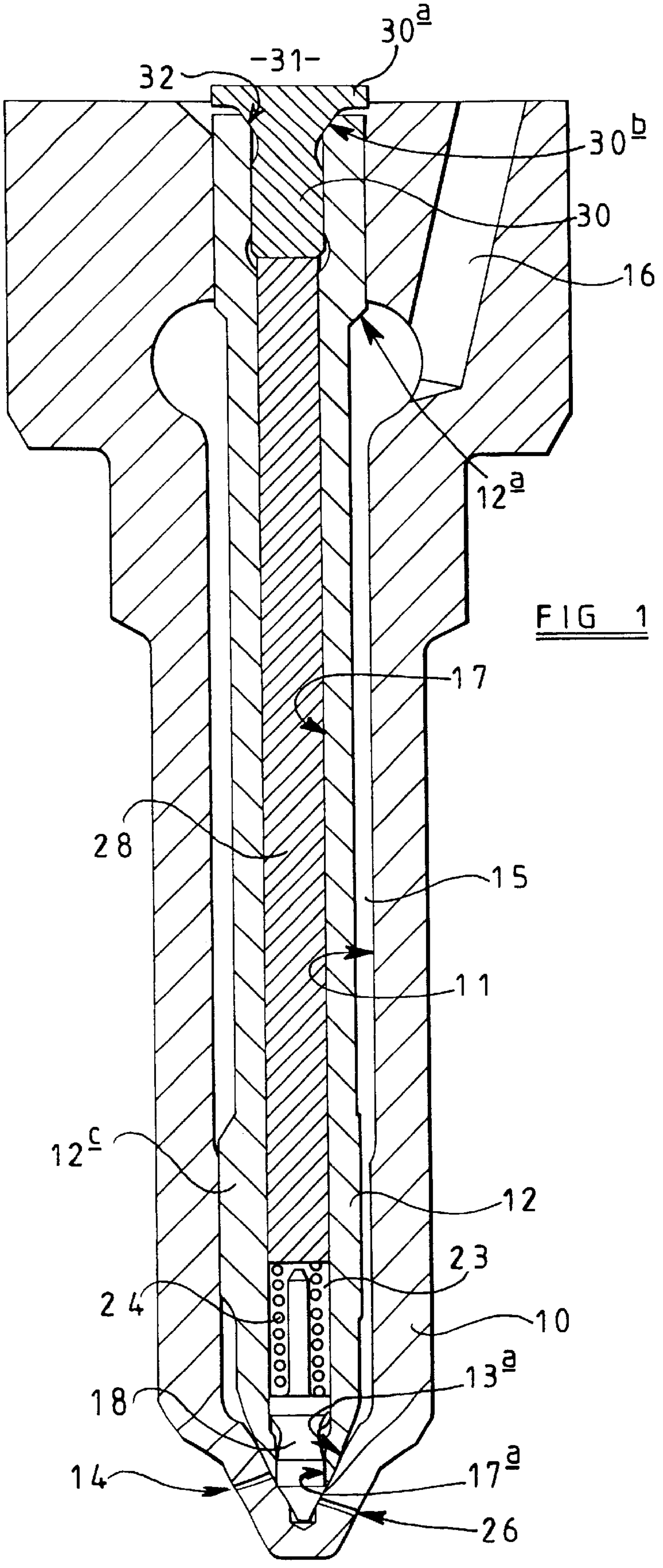
FIG. 1 is a fuel injector in accordance with an embodiment of the present invention.
Figure 2:
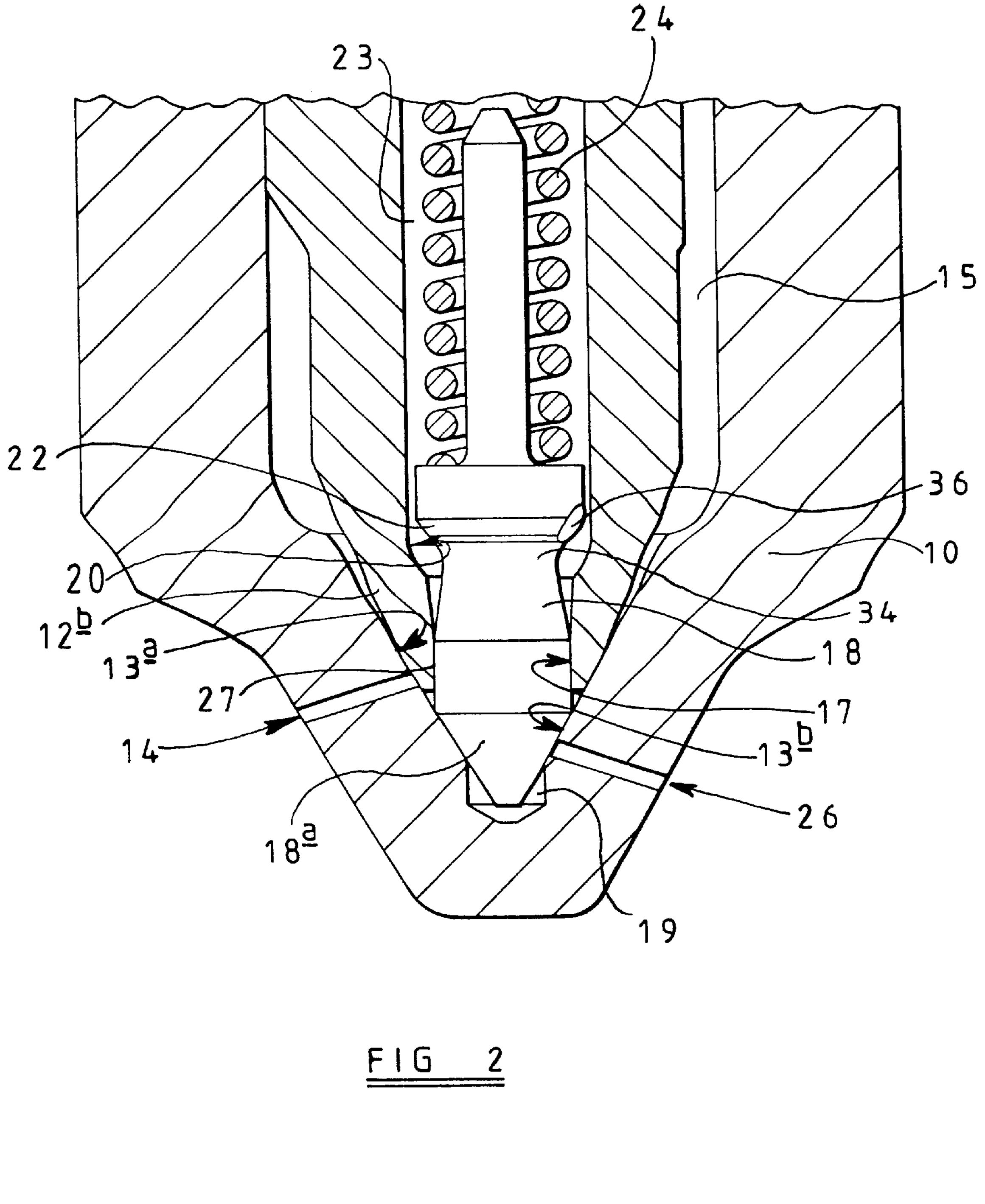
FIG. 2 is an enlarged view of a part of the fuel injector in FIG. 1.

Referring to FIGS. 1 and 2, a fuel injector includes a nozzle body 10 having a blind bore 11 formed therein. The blind end of the bore 11 is shaped to be of frusto-conical form and defines first and second seating surfaces 13*a*, 13*b*. An outer valve needle 12 is slidable within the bore 11 and is engageable with the first seating 13*a* to control fuel delivery through a first set of outlet openings 14 (only one of which is shown). The valve needle 12 and bore 11 together define a delivery chamber 15 which communicates with a source of fuel at high pressure by means of a supply passage 16 defined, in part, within an upper part of the nozzle body 10. The outer valve needle 12 cooperates with the first seating 13*a* to control communication between the delivery chamber 15 and the first outlet opening 14.

The outer valve needle 12 is reciprocable within the bore 11 under the control of an appropriate control arrangement which controls the distance through which the outer valve needle 12 can move away from the first seating 13*a*. The control arrangement may comprise, for example, a piezoelectric actuator arrangement which includes a piezoelectric actuator element or stack. The outer valve needle 12 is provided with one or more thrust surfaces 12*a*, fuel pressure within the delivery chamber 15 acting on the thrust surfaces 12*a* to urge the valve needle away from the first seating 13*a*, in use. The outer valve needle 12 also includes an enlarged region 12*c* extending radially from one section of the outer valve needle 12, the enlarged region 12*c* having substantially the same diameter as the adjacent part of the bore 11. Cooperation between the enlarged region 12*c* of the outer valve needle 12 and the bore 11 serves to guide the outer valve needle 12 during axial movement and ensures that the outer valve needle 12 remains concentric with the nozzle body 10, in use. The outer valve needle 12 may be provided with flats or slots (not shown) on the outer surface to permit fuel in the delivery chamber 15 to flow past the enlarged region 12*c*. The outer valve needle 12 further includes an end region 12*b*, the end region 12*b* being shaped so as to be capable of deformation when the axial load applied to the outer valve needle 12 is increased beyond a predetermined amount.

The outer valve needle 12 is provided with a through bore 17 including a region 17*a* of reduced diameter within which an inner valve needle 18 is slidable, the inner valve needle 18 having a tip region 18*a* which extends into a sac region 19 defined by the blind end of the bore 11. The bore 17 is shaped to define a further seating surface 20 of substantially frustoconical form with which a region 22 of the inner valve needle 18 is engageable. The seating 20 defined by the bore 17 and the region 22 together define a clearance gap such that, in use, when the outer valve needle 12 is moved inwardly within the bore 11 away from the first seating 13*a* by an amount greater than the clearance gap, the seating 20 engages the region 22 causing movement of the outer valve needle 12 to be transmitted to the inner valve needle 18.

The bore 17 defines a spring chamber 23 within which a compression spring 24 is housed, the compression spring 24 serving to urge the inner valve needle 18 downwardly against the second seating 13*b* such that the tip region 18*a* of the inner valve needle 18 covers a second set of outlet openings 26 (only one of which is shown) provided in the nozzle body 10. In use, when the inner valve needle 18 is moved away from the seating 13*b*, the tip region 18*a* of the valve needle 18 uncovers the second set of outlet openings 26 to permit fuel delivery therethrough. The inner valve needle 18 and the outer valve needle 12 together define a clearance 27 which permits fuel to enter and escape from the spring chamber 23, in use.

One end of the compression spring 24 abuts the upper end surface of the inner valve needle 18, the other end of the compression spring 24 being in abutment with the lower end surface of a spacer member 28 which is received within bore 17. At the end of the spacer member 28 remote from the chamber 23, the spacer member 28 abuts a valve insert member 30 provided with a surface 30*b*, the valve insert member 30 being received within the bore 17 and the surface 30*b* being engageable with a corresponding additional seating 32 defined by the bore 17. It will be appreciated that the spacer member 28 and the valve insert member 30 may be integrally or separately formed.

The valve insert member 30 includes, at its uppermost end, a region 30*a* of enlarged diameter, the upper end surface of the valve insert member 30 therefore being of increased diameter. Typically, the enlarged upper end surface of the valve insert member 30 may be acted on by means of a spring (not shown) which serves to urge the valve insert member 30, and hence the outer valve needle 12, inwardly within the bore 11. The enlarged upper end surface may also define, in part, a control chamber 31 for fuel, fuel pressure within the control chamber 31 being varied so as to control movement of the outer valve needle 12 within the bore 11.

The spacer member 28 and the valve insert member 30 are slidable within the bore 17 such that, in use, if fuel pressure within the chamber 23 defined, in part, by the bore 17, exceeds that in the control chamber 31, the spacer member 28 is moved upwardly within the bore 17 causing the surface 30*b* to lift away from the seating 32. Fuel is therefore able to escape from the chamber 23 to the control chamber 31 to reduce fuel pressure within the chamber 23. Conventionally, the seating 32 defined by the bore 17 with which the valve insert member 30 is engageable to control fuel flow between the spring chamber 23 and the control chamber is provided part way along the length of the bore 17. By providing the seating 32 at or very close to the open end of the bore 17, manufacturability of the injector is improved.

As can be seen most clearly in FIG. 2, the inner valve needle 18 includes a further region 34 of substantially frusto-conical form, the further region 34 being located downstream of the region 22. Thus, when the outer valve needle 12 is moved inwardly within the bore 11 and the surface 20 engages the region 22, the further region 34 adopts a position downstream of the seating 20. The region 22 of the inner valve needle 18 is also provided with one or more flats or grooves 36 such that, when the region 22 of the inner valve needle 18 is seated against the seating 20, the fuel is able to flow to and from the chamber 23 past the region 22.

In use, the fuel injector is arranged such that the delivery chamber 15 is supplied with fuel through the supply passage 16 from a source of fuel under high pressure, for example, the common rail of a common rail fuel system, the common rail being charged to a high pressure by an appropriate high pressure fuel pump. Prior to commencement of injection, the actuator arrangement is operated in such a manner that the outer valve needle 12 engages the first seating 13*a*. As a result, fuel within the delivery chamber 15 is unable to flow past the seating 13*a* out through the first set of openings 14. During this stage of the operation, the compression spring 24 biases the inner valve needle 18 against the second seating 13*b*, the tip region 18*a* of the inner valve needle 18 covering the second set of outlet openings 26. As fuel is unable to flow past the first and second seatings 13*a*, 13*b*, fuel injection does not therefore take place.

Figure 3:
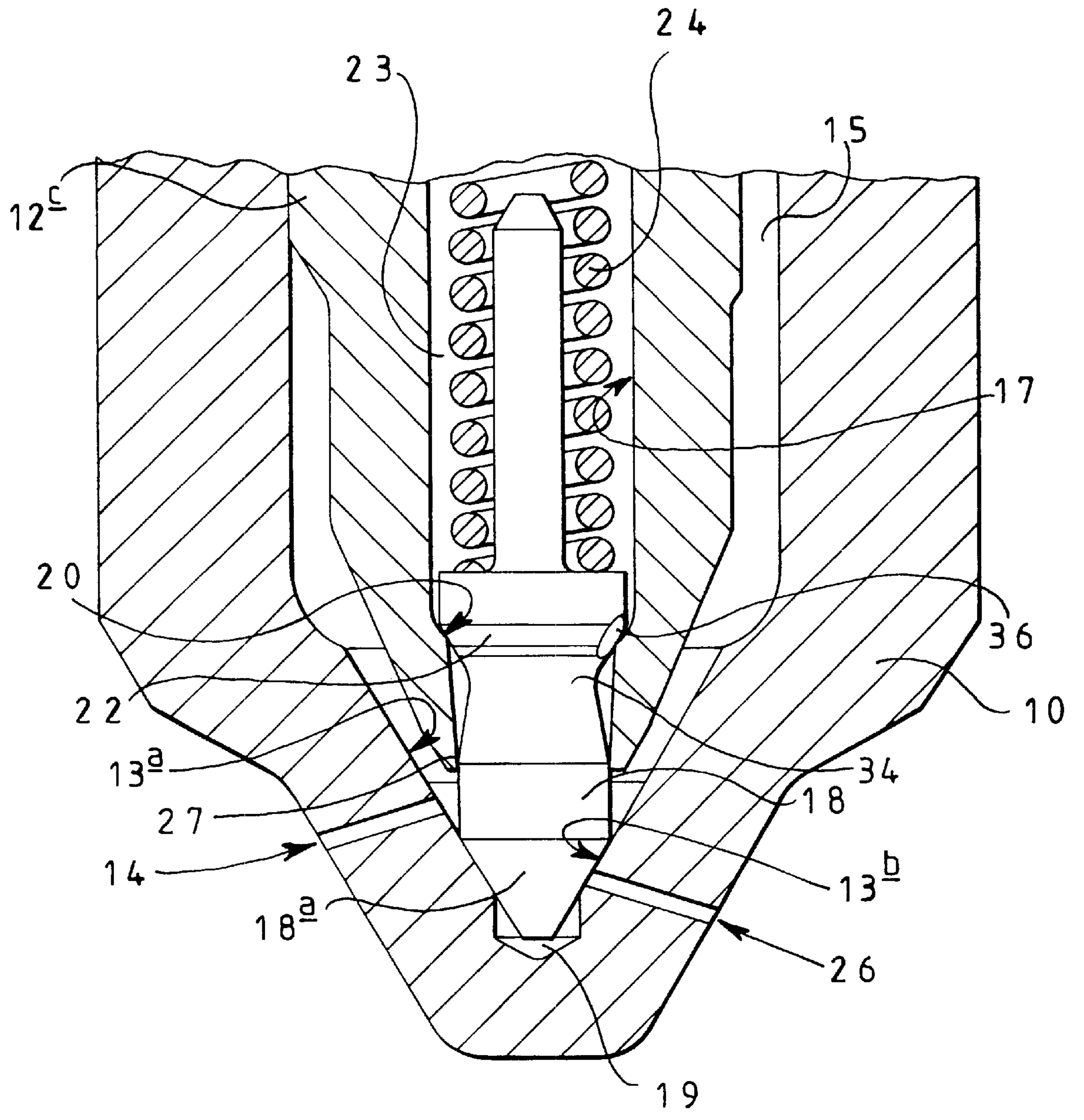
FIGS. 3 and 4 are enlarged views of the fuel injector in FIGS. 1 and 2 in first and second fuel injecting positions respectively.

When fuel injection is to be commenced, the actuator arrangement is operated in such a manner that the valve insert member 30, the spacer member 28 and the outer valve needle 12 are moved in an upwards direction, causing the outer valve needle 12 to be lifted away from the first seating 13*a* to the position shown in FIG. 3. Lifting may be aided by the action of the fuel under pressure within the delivery chamber 15 acting upon the thrust surface 12*a* of the outer valve needle 12. Upward movement of the outer valve needle 12 away from the first seating 13*a* permits fuel to flow from the delivery chamber 15 past the first seating 13*a* and out through the first set of outlet openings 14. Provided the outer valve needle 12 is only moved upwardly through a distance which is less than the clearance gap defined between the region 22 of the valve needle 18 and the seating 20 defined by the bore 17, the seating 20 does not move into engagement with the region 22 of the inner valve needle 18. The inner valve needle 18 therefore remains in engagement with the second seating 13*b* under the action of the spring 24 and fuel pressure within the chamber 23. As a result, fuel is unable to flow past the second seating 13*b* out through the second set of outlet openings 26. It will therefore be appreciated that, as fuel is only injected through the first set of outlet openings 14, injection of fuel occurs at a relatively low rate for a given applied fuel pressure.

Figure 4:
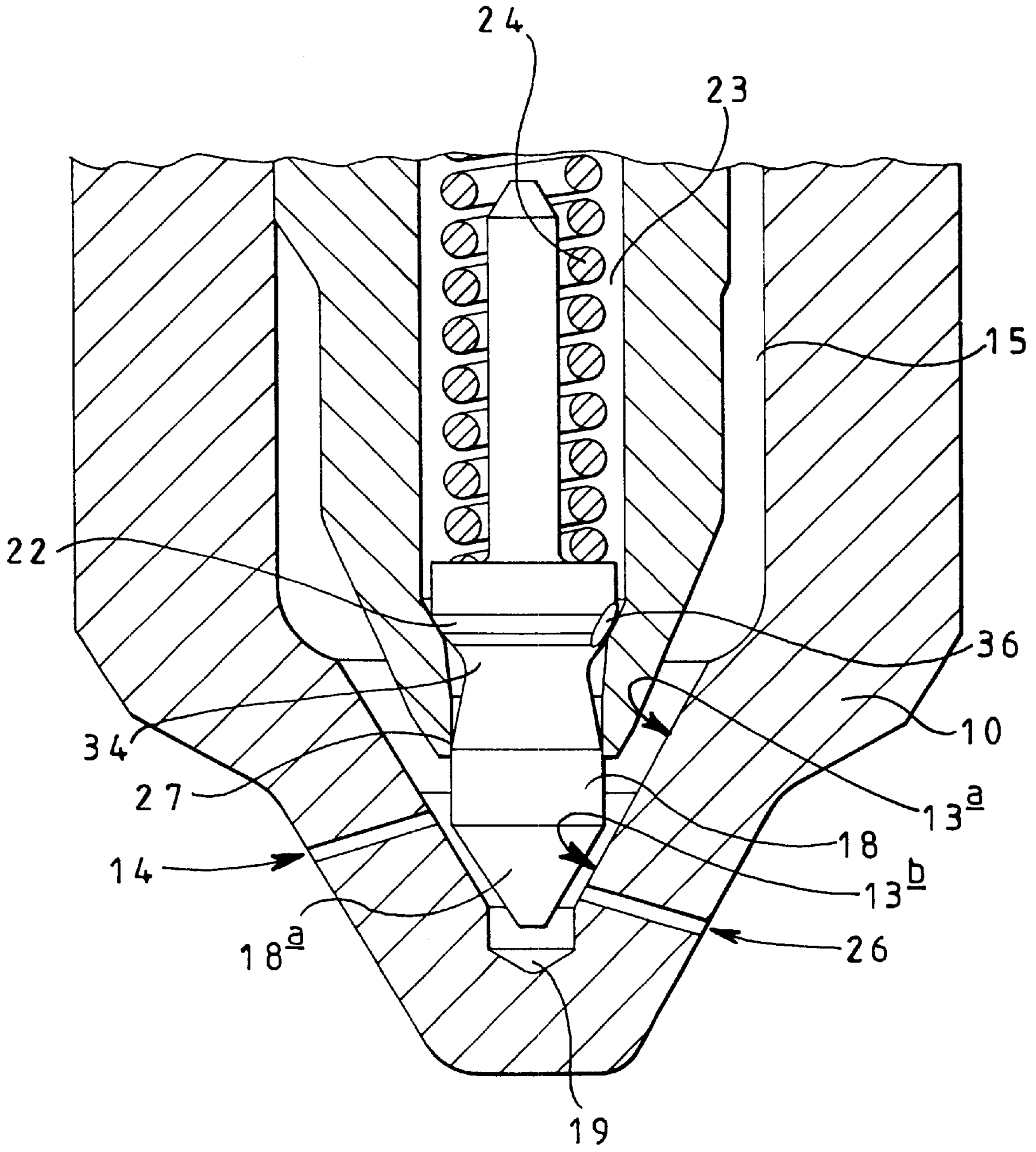

When the fuel is to be injected at a higher rate for a given fuel pressure, the actuator arrangement is actuated such that the valve insert member 30, the spacer member 28 and the outer valve needle 12 are moved through a further distance into the position shown in FIG. 4, further movement of the outer valve needle 12 away from the first seating 13*a* resulting in the seating 20 moving into engagement with the region 22 of the inner valve needle 18. Movement of the outer valve needle 12 is therefore transmitted to the inner valve needle 18 and the inner valve needle 18 lifts away from the second seating 13*b*. As a result, fuel is able to flow from the delivery chamber 15 past the second seating surface 13*b* and out through the second set of outlet openings 26. As fuel is delivered through both the first and second set of outlet openings 14, 26 during this stage of operating, it will be appreciated that fuel is delivered at a relatively high rate for a given fuel pressure.

In order to terminate injection, the actuator is operated such that the outer valve needle 12 is returned to the position illustrated in FIGS. 1 and 2 in which the outer valve needle 12 engages the first seating 13*a* and the tip region 18a of the inner valve needle 18 engages the second seating 13*b*. It will be appreciated that, prior to engagement of the outer valve needle 12 with the first seating 13*a*, the tip region 18*a* of the inner valve needle 18 moves into engagement with the second seating 13*b*. It will therefore be appreciated that termination of fuel injection through the second set of outlet openings 26 occurs prior to termination of injection through the first set of outlet openings 14.

As the end region 12*b* of the outer valve needle 12 is deformable, when an increased axial load is applied to the valve insert member 30 to urge the outer valve needle 12 against the first seating 13*b*, the end region 12*b* of the outer valve needle 12 deforms inwardly and co-operates with the inner valve needle 18 so as to form a substantially fluid tight seal. The seal formed between the inner valve needle 18 and the region 12*b* of the outer valve needle closes the clearance 27 and, thus, any fuel remaining in the chamber 23 following an injection of fuel cannot escape from the chamber 23 through the clearance passage 27. Undesirable leakage of fuel through the first and second outlet openings 14, 26 during this non-injecting stage is therefore substantially avoided. Additionally, as the chamber 23 is sealed when the end region 12*b* of the outer valve needle 12 deforms, exhaust gases from the engine cylinder or other combustion space cannot flow into the chamber 23 and contaminate fuel therein.

During the fuel injecting stage of operation, with a reduced axial load applied to the outer valve needle 12, the outer valve needle 12 lifts away from the first seating 13*a* and the end region 12*b* deforms outwardly so as to move away from the inner valve needle 18, breaking the fluid tight seal and opening the clearance 27. Thus, during this stage of operation, fuel is able to escape from the chamber 23 through the clearance 27 defined between the outer valve needle 12 and the inner valve needle 18. Fuel is also able to enter the chamber 23 to re-pressurise the chamber 23 if the pressure in the delivery chamber 15 exceeds that in the chamber 23. As fuel is able to enter and escape from the chamber 23 through the clearance passage 27, fuel is prevented from becoming trapped within the chamber 23. The effects of fuel degradation are therefore minimised.

The valve insert member 30 also provides a means of venting the chamber 23 during the fuel injecting cycle. In use, the amount of fuel which flows from the spring chamber 23 to the control chamber at the uppermost end of the outer valve needle 12 is determined by the fuel pressure difference between these two chambers, the length of time that the pressure difference is maintained and the fuel flow area through which the fuel flows. The fuel flow area may be increased by including further flats or slots on the surface of the valve insert member 30. The fuel pressure difference and the length of time that the fuel pressure difference is maintained are determined by the operating conditions and the type of actuator arrangement use to control movement outer valve needle 12.

The fuel injection of the present invention is also advantageous in that, just prior to the point when the outer valve needle 12 moves into engagement with the region 22 of the inner valve needle 18, the stresses in the inner valve needle 18 are reduced due to the frusto-conical shaping of the further region 34. Additionally, the seating 20 defined by the bore 17 and the region 22, both being of substantially frusto-conical form, are relatively easy to manufacture.

By providing first and second sets of outlet openings 14, 26 having a different number of openings, or having openings of different size, or having openings providing a different spray pattern, the fuel injection characteristic, for example the fuel injection rate, may be varied in use by injecting fuel through one or both sets of outlet openings.

Figure 5:
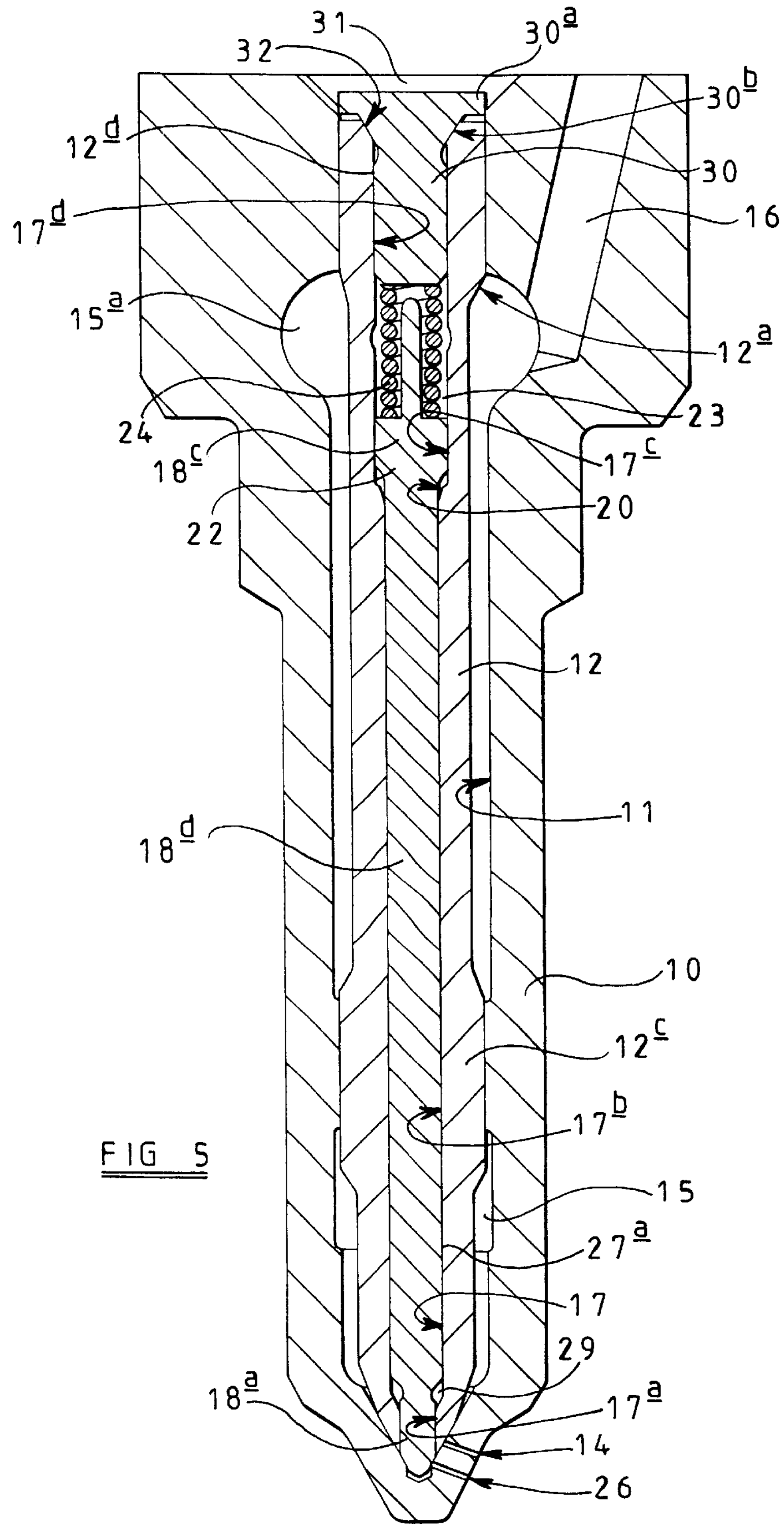
FIG. 5 is a sectional view of a fuel injector in accordance with an embodiment of the present invention.
Figure 6:
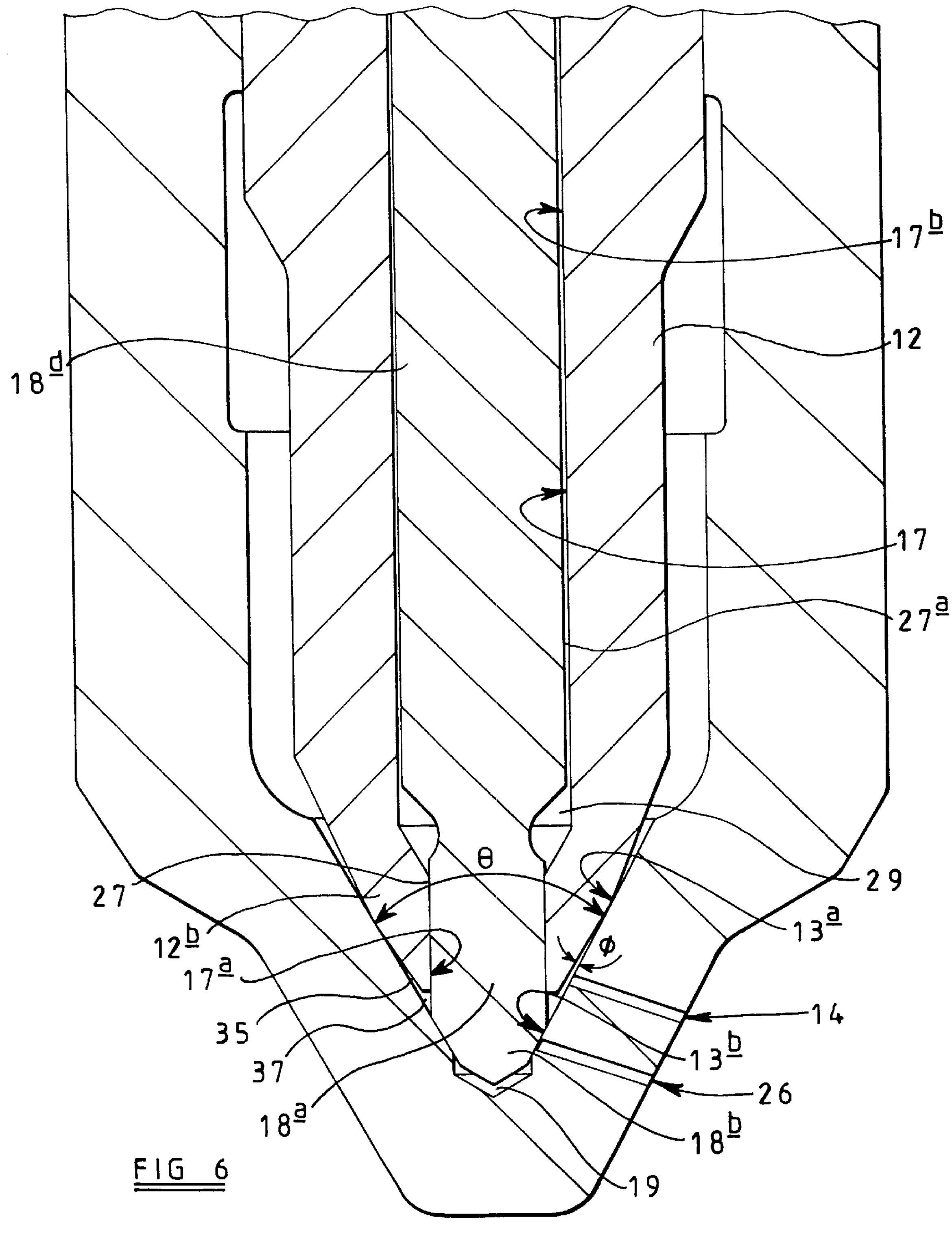
FIGS. 6 and 7 are enlarged sectional views of the fuel injector in FIG. 5 when in first and second positions respectively.
Figure 7:
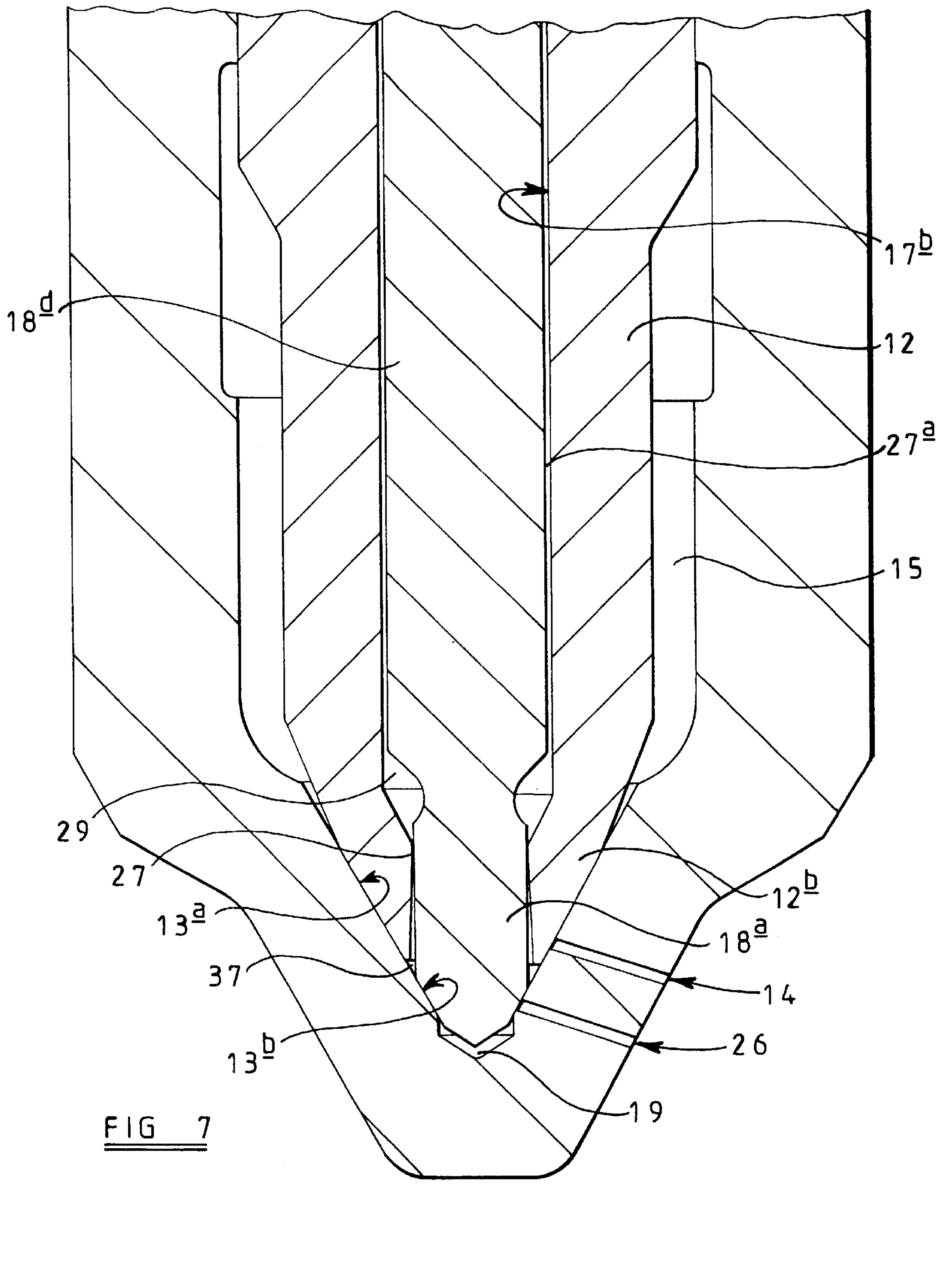

Referring to FIGS. 5 to 7, there is shown an alternative embodiment of the present invention in which similar parts to those shown in FIGS. 1 to 4 are denoted with like reference numerals. The embodiment shown in FIGS. 5 to 7 differs from that shown in FIGS. 1 to 4 in that the inner valve needle 18 is of elongate form and the seating 20 is positioned relatively close to the uppermost open end of the bore 17, and remote from the deformable region 12*b* of the outer valve needle. Manufacturability of the injector is therefore improved as it is more difficult to form the seating 20 close to the lowermost, open end of the bore 17, as shown in FIG. 1. It will be appreciated that, as the inner valve needle 18 is of elongate form, the need for the spacer member 28 is removed.

The through bore 17 provided in the outer valve needle 12 includes a region 17*a* of reduced diameter, an intermediate region 17*b* of intermediate diameter and an upper region 17*c* of enlarged diameter. The inner valve needle 18 includes a lower, tip region 18*a* of reduced diameter, an upper region 18*c* of enlarged diameter and an intermediate region 18*d* of intermediate diameter. As can be seen most clearly in FIG. 6, the region 18*a* of the inner valve needle 18 terminates in a tip portion 18*b* which extends into the sac region 19. The diameters of the lower region 18*a* of the inner valve needle 18 and of the region 17*a* of the bore 17, and the diameters of the enlarged region 17*c* of the bore and the enlarged region 18*c* of the inner valve needle 18, are such that movement of the valve needle 12 within the bore 17 is guided. The interconnection between the regions 17*b*, 17*c* of the bore 17 forms a step which defines the seating 20 with which a surface of the region 18*c* of the inner valve needle 18 is engageable.

The spring chamber 23 communicates, by means of a clearance 27*a* defined between the region 17*b* of the bore 17 and the region 18*d* of the inner valve needle 18, with a further chamber 29 defined, in part, within the bore 17. The lower region 18*a* of the inner valve needle 18 and the region 12*b* of the outer valve needle 12 together define a clearance 27 which permits fuel to enter and escape from the chamber 29, in use. Thus, fuel is able to enter and escape from the chamber 23, in use, through the clearances 27, 27*a*.

One end of the compression spring 24 abuts a part of the upper end surface of the region 18*c* of the inner valve needle 18, the other end of the compression spring 24 being in abutment with the lower end surface of the valve insert member 30 which is slidable within a region 17*d* of the bore 17. As described previously, the valve insert member 30 is slidable within the region 17*d* of the bore 17 such that, in use, if fuel pressure within the chamber 23 exceeds fuel pressure within the control chamber 31, the valve insert member 30 is moved upwardly within the bore region 17*d* causing the surface 30*b* thereof to lift away from the seating 32. Fuel is therefore able to vent from the chamber 23 to the control chamber 31 to reduce fuel pressure within the chamber 23.

As indicated in FIG. 6, the outer surface of the region 12*b* of the outer valve needle 12 is shaped such that, when the outer valve needle 12 adopts a first position in which the surface of the region 12*b* engages the first seating 13*a*, a clearance 35 is defined by a portion of the region 12*b* downstream of the seating 13*a* and the adjacent part of the bore 11. The clearance 35 communicates with a limited volume 37 defined by the bore 11, the region 18*a* and the region 12*b*. Typically, the region 12*b* of the outer valve needle 12 may be shaped such that the angle 2 (as shown in FIG. 6) subtended by the region 12*b* in the region of engagement with the seating 13*a* is approximately 60° and the angle N subtended by the clearance 35 is approximately 0.125° . By shaping the surface of the region 12*b* in this way, following initial engagement between the region 12*b* and the seating 13*a* to prevent fuel flow past the seating 13*a*, the outer valve needle 12 will be caused to move to a second position (as shown in FIG. 7), a portion of the region 12*b* downstream of the first seating 13*a* deforming to close the clearance 35, and hence closing the first set of outlet openings 14, as will be described in further detail hereinafter.

In use, with fuel under high pressure delivered through the supply passage 16 and prior to commencement of injection, the actuator arrangement is operated in such a manner that the region 12*b* of the outer valve needle 12 engages the first seating 13*a*. As a result, fuel within the delivery chamber 15 is unable to flow past the seating 13*a* out through the first set of outlet openings 14. During this stage of the operation, the compression spring 24 biases the inner valve needle 18 against the second seating 13*b*, such that the lower region 18*a* of the inner valve needle 18 closes the second set of outlet openings 26. As fuel is unable to flow past the first and second seatings 13*a*, 13*b*, fuel injection does not therefore take place.

When fuel injection is to be commenced, the actuator arrangement is operated in such a manner that the valve insert member 30 and the outer valve needle 12 are moved in an upwards direction, causing the outer valve needle 12 to be lifted away from the first seating 13*a*. Such lifting movement may be aided by the action of fuel under pressure within the delivery chamber 15 acting on the thrust surfaces 12*a* of the outer valve needle 12. Upward movement of the outer valve needle 12 away from the first seating 13*a* permits fuel to flow from the delivery chamber 15 past the first seating 13*a* and out through the first set of outlet openings 14.

Provided the outer valve needle 12 is only moved upwardly through a distance which is less than the clearance gap defined between the region 18*c* of the inner valve needle 18 and the seating 20 defined by the bore 17, the seating 20 does not move into engagement with the region 18*c*. The inner valve needle 18 therefore remains in engagement with the second seating 13*b* under the action of the spring 24 and fuel pressure within the chamber 23. As a result, fuel within the delivery chamber 15 is unable to flow past the second seating 13*b* out through the second set of outlet openings 26. Thus, as fuel is only injected through the first set of outlet openings 14, injection of fuel occurs only at a relatively low rate for a given applied fuel pressure.

When the fuel is to be injected at a higher rate for a given fuel pressure, the actuator arrangement is actuated such that the valve insert member 30 and the outer valve needle 12 are moved through a further distance, further movement of the outer valve needle 12 away from the first seating 13*a* resulting in the seating 20 moving into engagement with the region 18*c* of the inner valve needle 18. Movement of the outer valve needle 12 is therefore transmitted to the inner valve needle 18 such that the inner valve needle 18 lifts away from the second seating 13*b*. As a result, fuel is able to flow from the delivery chamber 15 past the second seating surface 13*b* and out through the second set of outlet openings 26. Thus, as fuel is delivered through both the first and second sets of outlet openings 14, 26, fuel is delivered at a relatively high rate for a given fuel pressure.

In order to terminate fuel injection, the actuator is operated such that the outer valve needle 12 is returned, initially, to the position illustrated in FIG. 6 in which the region 12*b* of the outer valve needle 12 engages the first seating 13*a* and the lower region 18*a* of the inner valve needle 18 engages the second seating 13*b*.With the region 12*b* of the outer valve needle 12 seated against the seating 13*a*, the pressure of fuel downstream of the seating 13*a* will reduce to a value significantly less than fuel pressure within the control chamber 31. The portion of the region 12*b* of the outer valve needle 12 downstream of the seating 13*a* will therefore deform to close the clearance 35, as shown in FIG. 7, causing the first set of outlet openings 14 to be closed. Thus, with the first set of outlet openings 14 closed and with the region 18*a* of the inner valve needle closing the second set of outlet openings 26, fuel injection is ceased. It will be appreciated that, upon termination of fuel injection, prior to engagement of the region 12*b* of the outer valve needle with the first seating 13*a*, the lower region 18*a* of the inner valve needle 18 moves into engagement with the second seating 13*b*. Thus, termination of fuel injection through the second set of outlet openings 26 occurs prior to termination of injection through the first set of outlet openings 14.

Deformation of the region 12*b* to close the first set of outlet openings 14 prevents any residual fuel within the volume 37 from escaping into the engine cylinder or other combustion space. Additionally, as the outer valve needle 12 deforms to close the first set of outlet openings 14, the volume 37 within which fuel can reside is considerably reduced compared with known fuel injectors of this type. This provides the advantage that the volume of fuel exposed to exhaust gases within the engine cylinder is reduced, thereby reducing undesirable emissions. Furthermore, as can be seen in FIG. 7, as the region 18*a* of the inner valve needle 18 covers the second set of outlet openings 26 during this stage of operation, any residual fuel within the volume 37 and the sac region 19 will be unable to escape to the engine cylinder through the second set of outlet openings 26.

It will be appreciated that, if the fuel injector is operated only as a single-stage lift injector, such that the inner valve needle 18 remains seated against the seating 13*b*, the sac region 19 will not refill with fuel between injections. This provides the advantage that, as no fuel will reside in the sac region 19, there is no fuel to escape to the engine cylinder between injections.

The shaping of the region 12*b* of the outer valve needle 12 and of the adjacent part of the bore 11 provided in the nozzle body 10 is preferably arranged to ensure that closure of the first set of outlet openings 14 by deformation of the region 12*b* occurs at minimum rail pressure. This will vary for different fuel injector applications. However, by way of example, the region 18*a* of the inner valve needle 18 may have a diameter of 1 mm, the angle 2 subtended by the region 12*b* may be 60° , the angle N subtended by the clearance 35 may be approximately 0.125° and the first seating 13*a* may have a diameter of 2.25 mm. A fuel injector having these dimensions will cause the region 12*b* of the outer valve needle 12 to deform to close the first set of outlet openings 14 at a rail pressure of approximately 500 Bar.

As described hereinbefore with reference to FIGS. 1 to 4, the region 12*b* of the outer valve needle 12 in FIGS. 5 to 7 may also be arranged such that it deforms inwardly and cooperates with the region 18*a* of the inner valve needle 18 to form a substantially fluid tight seal. The seal formed between the region 18*a* of the inner valve needle 18 and the region 12*b* of the outer valve needle 12 closes the clearance 27 and any fuel remaining within the chambers 23, 29 following an injection of fuel cannot therefore escape through the clearance 27. Undesirable leakage of fuel into the volume 37 and out through the first and second outlet openings 14, 26 is therefore further reduced. Additionally, the seal formed between the region 12*b* of the outer valve needle and the region 18*a* of the inner valve needle and the seal formed at the seating 32 ensures the chambers 23, 29 are sealed when the region 12*b* of the outer valve needle 12 deforms. Thus, exhaust gases from the engine cylinder of other combustion space cannot flow into the chambers 29, 23 and contaminate any fuel therein.

It will be appreciated that a different number of outlet openings to those shown in the accompanying figures may be provided in each of the first and second sets 14, 26. Although the second set of outlet openings 26 does not communicate with the sac region 19 in the embodiments of the invention described herein, it will be appreciated that the fuel injector may be of the type in which the second set of outlet openings 26 does communicate directly with the sac region 19.

Although in the description hereinbefore the spring 24 has been referred to as a compression spring, it will be appreciated that any other resilient bias arrangements could be used. It will also be appreciated that, if desired, the inner valve needle 18 may itself be provided with a bore within which a further valve needle is slidable to control delivery of fuel through one or more further outlet openings or groups of outlet openings.

We claim:

1. A fuel injector comprising a nozzle body having a first bore defining first and second seatings, an outer valve needle being slidable within the first bore and engageable with the first seating to control fuel flow from a first outlet opening, the outer valve needle being provided with a second bore within which an inner valve needle is slidable, the inner valve needle being engageable with the second seating to control fuel delivery through a second outlet opening, the outer valve needle including a deformable region which is shaped such that, in use, when the outer valve needle is urged against the first seating, the outer valve needle deforms, wherein the deformable region is shaped such that when the outer valve needle is urged against the first seating, the outer valve needle cooperates with the inner valve needle to form a substantially fluid tight seal.

2. The fuel injector as claimed in claim 1, wherein the deformable region is shaped such that, in use, when the outer valve needle is urged against the first seating, the outer valve needle deforms to close the first outlet opening.

3. The fuel injector as claimed in claim 1, wherein a chamber is defined within the second bore, whereby cooperation between the deformable region of the outer valve needle and the inner valve needle when the outer valve needle is urged against the first seating causes the chamber to be substantially sealed.

4. The fuel injector as claimed in claim 1, wherein the inner valve needle and the outer valve needle are arranged such that movement of the outer valve needle away from the first seating beyond a predetermined amount is transmitted to the inner valve needle, thereby causing the inner valve needle to move away from the second seating.

5. The fuel injector as claimed in claim 4, wherein the outer valve needle is provided with a surface which is engageable with a first region of the inner valve needle to transmit movement of the outer valve needle to the inner valve needle, wherein the first region and the surface are of substantially frusto-conical form.

6. The fuel injector as claimed in claim 5, wherein the surface of the outer valve needle which is engageable with the first region of the inner valve needle is located on the outer valve needle at a position remote from the deformable region.

7. The fuel injector as claimed in claim 6, wherein the inner valve needle comprises a second region located downstream of the first region, the second region being of substantially frusto-conical form such that stresses within the second region of the inner valve needle are minimized upon engagement between the surface of the outer valve needle and the first region of the inner valve needle.

8. The fuel injector as claimed in claim 1, further comprising a valve insert member received within an upper region of the second bore, the valve insert member being engageable with an additional seating defined by the open end of the second bore remote from the inner valve needle to permit fuel upstream of the inner valve needle to vent from the second bore.

9. The fuel injector as claimed in claim 8, further comprising a spacer member received within the second bore provided in the outer valve needle, the spacer member being interposed between the inner valve needle and the valve insert member.

10. A fuel injector comprising;

a nozzle body having a first bore defining first and second seatings, an outer valve needle being slidable within the first bore and engageable with the first seating to control fuel flow from a first outlet opening, the outer valve needle provided with a second bore within which an inner valve needle is slidable, the inner valve needle being engageable with the second seating to control fuel delivery through a second outlet opening, the outer valve needle including a deformable region which is shaped such that, when the outer valve needle is urged against the first seating, the outer valve needle deforms, wherein the inner valve needle and the outer valve needle are arranged such that movement of the outer valve needle away from the first seating beyond a predetermined amount is transmitted to the inner valve needle, thereby causing the inner valve needle to move away from the second seating, wherein the outer valve needle is provided with a substantially frusto-conical shaped surface which is engageable with a substantially frusto-conical shaped first region of the inner valve needle and is located on the outer valve needle at a position remote from the deformable region, to transmit movement of the outer valve needle to the inner valve needle.

11. The fuel injector as claimed in claim 10, wherein the deformable region is shaped such that when the outer valve needle is urged against the first seating, the outer valve needle deforms to close the first outlet opening.

12. The fuel injector as claimed in claim 10, wherein the deformable region is shaped such that when the outer valve needle is urged against the first seating, the outer valve needle cooperates with the inner valve needle to form a substantially fluid tight seal.

13. The fuel injector as claimed in claim 10, wherein a chamber is defined within the second bore, whereby cooperation between the deformable region of the outer valve needle and the inner valve needle when the outer valve needle is urged against the first seating causes the chamber to be substantially sealed.

14. The fuel injector as claimed in claim 10, wherein the inner valve needle comprises a second region located downstream of the first region, the second region being of substantially frusto-conical form such that stresses within the second region of the inner valve needle are minimized upon engagement between the surface of the outer valve needle and the first region of the inner valve needle.

15. The fuel injector as claimed in claim 10, further comprising a valve insert member received within an upper region of the second bore, the valve insert member being engageable with an additional seating defined by the open end of the second bore remote from the inner valve needle to permit fuel upstream of the inner valve needle to vent from the second bore.

16. The fuel injector as claimed in claim 10, further comprising a spacer member received within the second bore provided in the outer valve needle, the spacer member being interposed between the inner valve needle and the valve insert member.

* * * * *